April 4, 1939.  F. C. FETT ET AL  2,153,415
UNIVERSAL JOINT
Filed Oct. 20, 1937
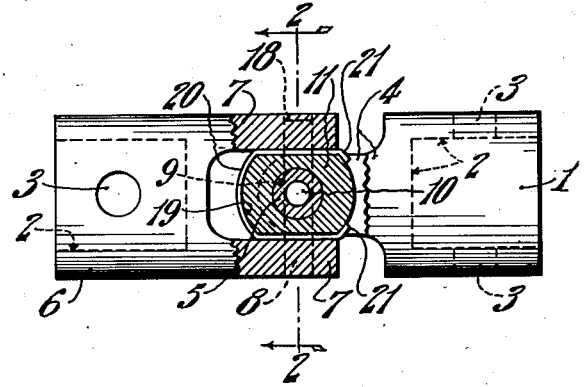
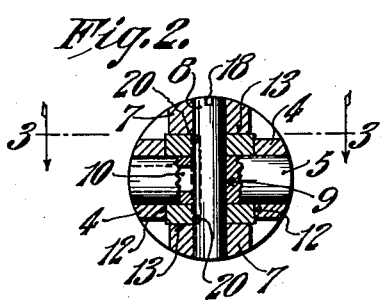 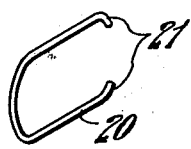 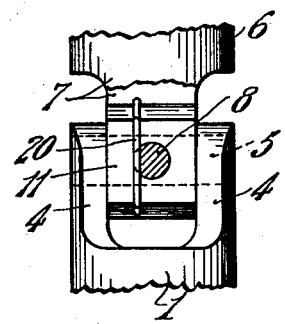
 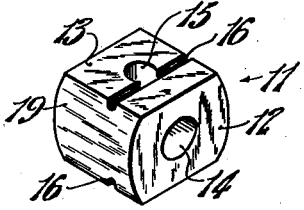 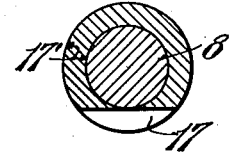
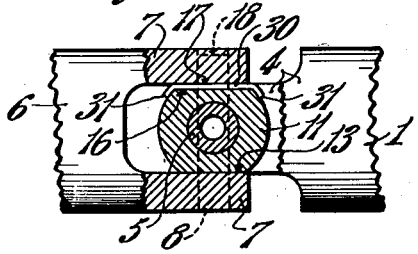  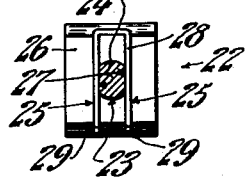
INVENTORS,
Frederick C. Fett,
BY Ralph K. Goddard,
Blake Hewer. ATTORNEY.

Patented Apr. 4, 1939

2,153,415

UNITED STATES PATENT OFFICE 2,153,415

UNIVERSAL JOINT

Frederick C. Fett and Ralph K. Goddard, Springfield, Mass., assignors to Curtis Universal Joint Co., Inc., Springfield, Mass., a corporation of Massachusetts Application October 20, 1937, Serial No. 170,032

4 Claims. (Cl. 64—17)

This invention relates to improvements in universal joints.

An object of this invention is to provide, in a universal joint including opposed clevis members, a central block, and pivot pins perpendicularly disposed for connecting the clevis members and central block, means for locking one of the pivot pins in place, in such a manner as to provide a practical maximum of cross sectional area of the pin opposed to torsional stress.

A second object of this invention is to provide, in a universal joint of the character described, locking means which are not only capable of quick and easy assembly in the joint, but which may be as easily removed from the assembly or replaced.

A third object of this invention is to provide a universal joint which is economical and simple of construction and design, and which may be assembled and disassembled without the aid of special tools.

Another object of this invention is to provide, in a universal joint of the character described, locking means for the pivot pin which will be plainly visible in the assembled joint, thereby providing a positive check for inspection of assembly.

These, and other objects and advantages of this invention, will be more completely described and disclosed in the following specification, the accompanying drawing, and the appended claims.

Broadly, this invention comprises a universal joint including opposed clevis members, a central block, a pivot pin connecting the arms of one of the clevis members and the central block, a second pivot pin relatively smaller than the first pin and connecting the arms of the other clevis member and the central block and passing through the first pivot pin, the central block being provided with transverse grooves on opposed faces, the second pivot pin being provided with spaced grooves perpendicular to its axis and registering with the grooves in the central block, and a keeper member positioned in said grooves, whereby the pivot pins are locked against longitudinal movement.

A preferred embodiment of this invention is illustrated in the accompanying drawing, in which:

Fig. 1 is a side elevational view, partially in section, of the assembled universal joint.

Fig. 2 is a cross sectional view, taken on the line 2—2 of Fig. 1.

Fig. 3 is a sectional view, taken on the line 3—3 of Fig. 2.

Fig. 4 is a perspective view of the keeper member.

Fig. 5 is an elevational view of the smaller pivot pin.

Fig. 6 is a perspective view of the central block.

Fig. 7 is a diagrammatic view, illustrating a cross sectional area of the smaller pivot pin at the locking groove.

Fig. 8 is a view similar to Fig. 3, illustrating a modified form of construction.

Fig. 9 is a perspective view of the keeper member, shown in Fig. 8, and

Fig. 10 is a view similar to Fig. 1, illustrating a further modified construction.

Referring now to the drawing in detail, in which like numerals refer to like parts throughout:

A clevis member 1, provided with the usual socket 2 and bored at 3 for receiving a connecting pin, is provided with opposed arm portions 4 bored to receive a connecting pin 5. A second clevis member 6, similar to the member 1, is provided with opposed arm portions 7, bored to receive a connecting and locking pin 8. The pin 5 is bored transversely at 9 to receive the locking pin 8, and also bored axially at 10 for receiving a lubricant. A center block 11, having opposed faces 12 which engage the inner surfaces of the arms 4 and opposed faces 13 which engage the inner surfaces of the arms 7, is bored at 14 to receive the pin 5 and bored at 15 to receive the pin 8. All of the above described construction is well known in the art.

This invention lies in the provision of means for locking the pin 8 in its assembled position in the universal joint. The center block 11 is provided with transverse grooves 16 in the faces 13 which communicate with the bore 15. The locking pin 8 is provided with spaced, transverse grooves 17 which are perpendicular to the axis of the pin 8 and which register, when the pin 8 is properly assembled and aligned in the arms 7 and center block 11, with the grooves 16. The pin 8 is provided at one end with a screw driver slot 18 which is parallel to the slots 17, and serves as aligning means for registering the grooves 17 with the grooves 16. With the clevis members 1 and 6, center block 11, and pins 5 and 8 assembled in proper relation, the member 1 and block 11 are moved about the axis of the pin 8, relative to the member 6, until a face 19 of the center block 11 is exposed, and with the parts in this position, a U-shaped keeper 20, preferably of soft wire, is thrust into the grooves 16 and 17, thus locking the pin 8 to the center block 11. After assembly of the keeper 20 in the block 11, the ends 21 of the keeper 20 are crimped or bent, as indicated in Figs. 1 and 4, to prevent accidental removal or displacement of the keeper 20. To disassemble the joint, it is only necessary to remove the keeper 20 by pulling the same out of the grooves 16 and 17 with a pair of pliers, a screw driver, or other convenient tool. If the keeper 20 should, for any reason be broken, it may be quickly replaced by cutting the proper length and diameter of soft wire, bending it into shape, and inserting it into the grooves in the center block and pin. As the ends 21 of the keeper 20 are plainly visible in the assembled joint at all times, a simple and readily apparent check is provided for assembly inspection, and for recheck after the universal joint is assembled on its shafts.

Universal joints, provided with a spring ring for locking the pin in place, are well known in the art. The assignee of this invention is also the assignee of Patent Number 1,806,723, issued to Eusebe Tetrault, on May 26, 1931, in which such a spring ring is incorporated, and have manufactured extensively under this patent. The invention herein disclosed has several advantages over the construction of the patent. The universal joint of this disclosure is relatively much stronger than a universal joint using a spring ring. When the locking spring ring is used, an annular groove must be cut in the locking pin to receive the ring. This annular groove removes several times the area of the groove 17, from the portion of the pin adjacent its perimeter, as shown at 17' in Fig. 7. Identical tests of the joint shown in the Tetrault patent and the joint disclosed herein indicated an ultimate torque resistance within a range of 2600 to 3700 inch pounds for the Tetrault joint and 4100 to 5200 inch pounds for the joint constructed according to this disclosure. The locking ring must necessarily be made of spring steel, in order to snap around the locking pin, and must be preshaped and tempered, and inserted in the center block before assembly of the center block in the clevises. It is always difficult to disassemble a joint in which the spring ring is incorporated, and, if the ring becomes broken, it is sometimes impossible to disassemble the joint. As the spring rings must be preshaped, they are seldom available for replacement purposes, and the joint becomes useless. In the present invention, the keeper 20 is as readily removd as installed, and as it is made of standard soft wire, it may be replaced immediately. The joint is completely assembled before the keeper is inserted.

Modifications of this invention are illustrated in Figs. 8, 9, and 10. In the construction illustrated in Figs. 8 and 9, a center block 22 is bored at 23 in the usual manner to receive a locking pin 24, and parallel transverse grooves 25 are cut in one face 26 of the block 22 and communicating with opposite sides of the bore 23. The locking pin 24 is provided with oppositely disposed parallel grooves 27 which register with the grooves 25 when the pin 24 is properly assembled in the block 22, and a U-shaped keeper 28 is inserted in the grooves 25 and 27 and the ends 29 bent or crimped, as shown. The construction shown in Fig. 10 is a simplified form of that illustrated in Fig. 1. The block 11 is provided with a single groove 16, and the pin 8 also with a single groove 17 registering with the groove 16, and a straight wire 30 is inserted in the grooves 16 and 17 and both ends 31 bent, or crimped, to hold the wire 30 in place.

What we claim is:

1. In a universal joint construction, a center block, a pivot pin, said center block having opposed, parallel flat faces and being bored perpendicular to said faces for receiving said pivot pin, said center block being provided with transverse grooves in said faces and communicating with said bore, said pivot pin being provided with spaced segmental grooves registering with the grooves in said center block and a U-shaped wire keeper engaged in the grooves in the center block and pivot pin for holding said pivot pin against axial movement.

2. In a universal joint construction, a center block, a pivot pin, said center block having opposed, parallel flat faces and a bore perpendicular to said faces for receiving said pivot pin, said center block being provided with transverse grooves in said faces and communicating with and tangent to said bore, said pivot pin being provided with straight, spaced transverse grooves cutting through its perimeter and registering with the grooves in said center block, and a keeper member engaged in the grooves in said center block and said pin for holding said pivot pin against longitudinal movement.

3. In a universal joint construction, a pair of clevis members, a center block, a pivot pin, a pivot locking pin, the arms of one of said clevis members and said center block having registering bores for receiving said pivot pin, the arms of the other of said clevis members and said center block and said pivot pin having registering bores for receiving said pivot locking pin, said pivot locking pin being provided with spaced segmental slots, said center block being provided with transverse slots in opposed faces and registering with the slots in said pivot locking pin, and a U-shaped, soft wire keeper engaged in said slots for retaining said pivot locking pin in said center block.

4. In a universal joint construction, a pair of clevis members, a center block, a pivot pin, a pivot locking pin, the arms of one of said clevis members and said center block having registering bores for receiving said pivot pin, the arms of the other of said clevis members and said center block and said pivot pin having registering bores for receiving said pivot locking pin, said pivot locking pin being provided with spaced segmental slots, said center block being provided with transverse slots in opposed faces and registering with the slots in said pivot locking pin, and a U-shaped, soft wire keeper engaged in said slots for retaining said pivot locking pin in said center block, said pivot locking pin being also provided with a screw driver slot in an end thereof and parallel to said segmental slots.

FREDERICK C. FETT.
RALPH K. GODDARD.